INVENTORS
ROLAND SILVER
THOMAS L. ETTER
BY Darby & Darby
ATTORNEYS

July 26, 1960 R. SILVER ET AL 2,946,927

ELECTRICAL COMPONENTS AND CIRCUITS AND METHODS OF FABRICATING THE SAME

Filed Nov. 22, 1955 4 Sheets-Sheet 2

INVENTORS
ROLAND SILVER
THOMAS L. ETTER

BY Darby & Darby

ATTORNEYS

July 26, 1960 R. SILVER ET AL 2,946,927

ELECTRICAL COMPONENTS AND CIRCUITS AND METHODS OF FABRICATING THE SAME

Filed Nov. 22, 1955 4 Sheets-Sheet 3

INVENTORS
ROLAND SILVER
THOMAS L. ETTER

BY Darby & Darby
ATTORNEYS

INVENTORS
ROLAND SILVER
THOMAS L. ETTER
BY
Darby & Darby
ATTORNEYS

United States Patent Office 2,946,927

Patented July 26, 1960

2,946,927

ELECTRICAL COMPONENTS AND CIRCUITS AND METHODS OF FABRICATING THE SAME

Roland Silver, Boston, Mass. (432 Broadway, Cambridge, Mass.), and Thomas L. Etter, 305 W. 103rd St., New York 25, N.Y.

Filed Nov. 22, 1955, Ser. No. 548,396

21 Claims. (Cl. 317—101)

The present invention relates to the structures and fabrication of information-transforming networks and finite machines as well as their converters.

Information-transforming networks and finite machines are apparatus whose function is primarily the handling of information or data as opposed to the handling of power or abstraction of the information-handling property of an apparatus whose functioning is mixed. Such information may represent any type of intelligence or signal desired to be transferred, transformed, converted or modified. As one example, a radio transmitter serves to transform a pattern of information such as speech, music, pictures or a telegraphic code, into another pattern of information in the form of an electromagnetic signal and, therefore, functions as a coding device for transforming such information. Other forms of information-transforming networks may include computing machines, coding devices, process-controlling devices, electronic circuits or the like.

Conventional information-transforming networks comprise a series of elementary components such as wires, resistors, capacitors, coils, relays, electron tubes of various types, transistors, etc., combined into diverse and relatively complex combinations. It has been a characteristic of the design of such components that during at least some phases of the manufacture of each individual component, it has been required that the subtly differentiated and complex perceptive abilities, responses and manipulative facilities of a human operator be present. As a consequence, because of the limits of the manipulative abilities of human operators, there exists a lower limit of size of such components, requiring them to house several or many cubic centimeters in volume. Also, it is characteristic of present information-transforming networks, that the assembly of these components requires many essentially different kinds of operations performed by human operators, i.e., the placement of wires and other components, securing them, soldering them, plugging in or mounting components, etc. Because of these conditions of manufacture, the unit cost of components cannot be decreased beyond a lower threshold, the assembly time of the complete information-transforming networks is long, and they are relatively bulky and expensive, which forms a limitation on the complexity of such devices which can be fabricated.

The present invention is specifically concerned with providing generalized forms of components and assemblages of components for information-transforming networks which can be formed and assembled by relatively simple fully automatic procedures having a minimum of human attendance permitting considerable lower unit cost and much smaller size of components. The term "fabric" has been selected to designate the generic form of assemblage of components according to the basic principles of the present invention.

According to this invention, the various forms of components, differentiated according to their electrical function, are designed and adapted to be produced preferably automatically and are formed from a common base structure upon which selectively different but simple operations are performed to convert that base structure into the respective components. That base, according to a preferred form of the invention, is a rod or thread of insulating material, which can be fabricated as separate sections of convenient length or can be fabricated as a continuous length such as might be coiled upon a spool or reel. Successive preferably equal or modular lengths of the base material are then fabricated into their respective components of the final information-transforming network. Such fabrications may include such steps as depositing various layers thereon and selectively cutting away certain layers. In the case of the continuous length base, these components are not in any way severed from the base material or from each other but are formed in succession in the order required for the automatic assembly procedure indicated below. To assemble such components into the final information-transforming network, the order of their fabrication on the base is designed so that, by a simple disposition or arrangement of the base, selected components are automatically juxtaposed as desired, and means are provided in their structure and in their juxtaposition to form suitable electrical connections as required for the purposes at hand. Once the desired network is established, the sequence of fabrication of the components is determined as well as the sequence and manner of the juxtaposition.

The term "fabric" more particularly means a geometric array of components having the same generic form with a small number of specific different characteristics. One form of "fabric" may be a honeycomb or rectangular array of rotationally symmetrical cylindrical components such as rods and another form may be a single or multilayer helical winding of one or more continuous bases with components formed thereon, in which the juxtaposition of successive turns or of successive layers provides the necessary interconnection.

It is accordingly a principal object of the present invention to provide a new form of a variety of electrical components, having a generic resemblance, and circuits made therefrom, to provide a novel manner of interconnection into any desired predetermined network or circuit, particularly adapted for the automatic fabrication of both the components and the circuit, forming an improved form of "automation" for the small-current electrical industry.

The other objects and advantages of the present invention will be better understood from consideration of the following description taken in conjunction with the appended drawings, in which.

Figure 1:
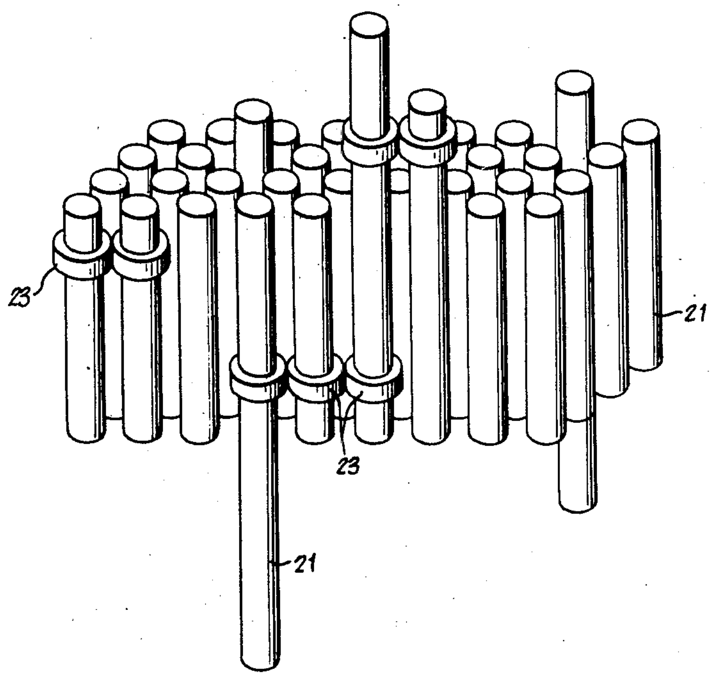
Fig. 1 is a perspective view of a portion of "fabric," cut out from the whole.

Fig. 1 shows a general view of a portion of fabric, made up of a plurality of juxtaposed base filaments (i.e., rods or continuous threads) which at different locations therealong, carry structures which perform the function of electrical circuit components, the arrangement and contiguity of which form a circuit. Before describing the circuit in detail, it is believed simpler and clearer first to describe the structure of various of the common electrical components according to the invention. These components may include such things as resistors, capacitors, coils, rectifiers, tubes, relays and wires or the like.

*I. Resistors*

Figure 2:
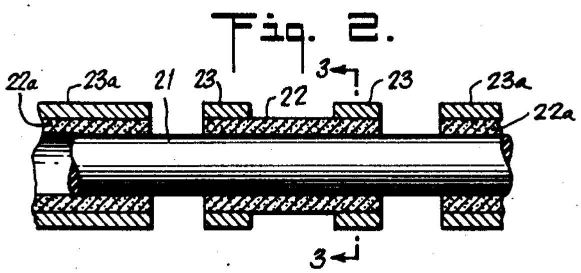
Fig. 2 is an elevational view partly in longitudinal section of a resistor element according to the invention.
Figure 3:
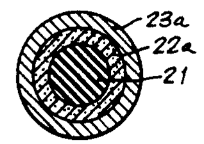
Fig. 3 is a transverse cross-sectional view of Fig. 2 along line 3—3 thereof.

Figs. 2 and 3 illustrate the manner in which resistors may be fabricated. The base or core 21, illustrated as a circular cross-section filament of insulating material (such as synthetic plastic, glass, quartz or the like), is coated as shown schematically at 22 by a layer of any suitable material having electrically resistive properties. At each end of the resistive layer 22 is formed a conductive band 23 which provides the terminals for the resistor.

This resistive coating 22 may be applied by spraying, painting, brushing or the like and its thickness, resistivity and length are correlated to the desired resistive value to be obtained. As is well known, the total resistance is directly proportional to the length and specific resistivity and inversely proportional to the cross-sectional area of resistance material.

The terminal bands 23 are made of conductive material, and may similarly be applied by spraying, painting, brushing, dip-coating, squeegeeing; from a medium containing metallic powders and binder suspended in a liquid, followed by drying and/or firing or sintering; by deposition by chemical reduction; by vacuum evaporation; by deposition by decomposition of a gaseous metal compound (such as nickel carbonyl); by deposition of solution ceramics; by sputtering or printing; or by plating or by mechanically clamping a metallic strip around the base filament 21. The terminal bands 23 are spaced by a fixed modular distance, which is an integral multiple of a unit dimension chosen for the entire system of components. As will be seen below, this dimension may be a unit length or a unit arc.

One desirable method of fabrication is to provide a blank, formed by the core 21, with a continuous resistive coating **22*a* thereon and a continuous outer conductive coating 23*a*. Such coatings can be formed in well known manner as by plating, depositing, dipping, sputtering, painting, etc. Then by machining, abrading, etching or the like, the blank has its conductive coating 23*a* removed except for the terminal bands 23, and has the resistive coating 22*a* removed adjacent the bands 23, except for the layer 22. The core 21** may be reinforced by a central thread of higher tensile strength material, such as metal, surrounded by an insulating layer, if desired.

Figure 4:
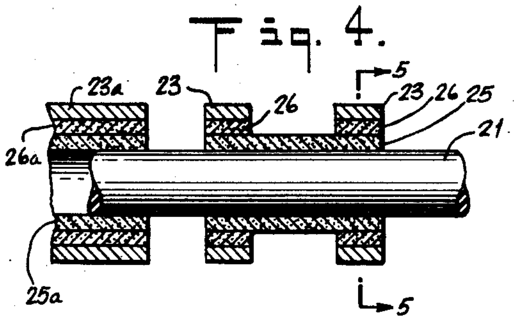
Fig. 4 is an elevational view partly in longitudinal section of a modified form of resistor element.
Figure 5:
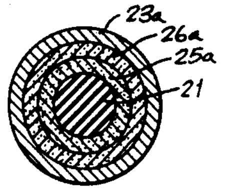
Fig. 5 is a transverse cross-sectional view of the structure of Fig. 4 along line 5—5 thereof.

A further form of such resistors is shown in Figs. 4 and 5 which provides a closer control of the resistance value. As shown in this case, the insulating core 21 has a coating 25 of resistance material with a relatively low resistivity. At either end of the low-resistance layer 25 is a short length of more highly resistive material forming a band 26, and these bands 26 in turn are encircled by conductive terminal bands 23. The ultimate value of the resistor element is thus formed by the sum of the radial resistances of the two bands 26 and the axial resistance of the layer 25, and can then be readily adjusted to a final value by abrading or removing a sufficient amount of the low-resistance layer 25 between the two terminal bands 23.

The method of fabrication may be as for Fig. 2, having a blank formed by core 21, a continuous lower resistance layer **25*a*, a continuous higher resistance layer 26*a*, and an outer conductive layer 23*a*, which by machining, abrading or the like can leave the component shown in Fig. 4 formed on the core 21**.

Figure 6:
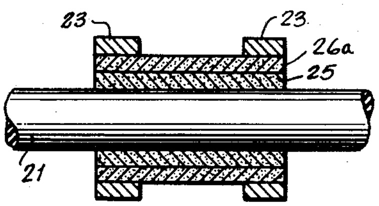
Fig. 6 is a similar elevational view of a further modified form of resistor element.

In this form, the current flow will be from one terminal band 23 through the high resistive layer 26, through the low resistive layer 25, back through the other high resistive layer 26, to the other terminal band 23. In some circumstances this might provide excessive potential gradients in the resistive material where large voltage drops occur across the resistor. This can be avoided by the form shown in Fig. 6, in which the low resistive layer 25 is completely surrounded by a high resistive layer **26*a* and the terminal bands 23 are placed at the ends of the high resistive layer 26*a*. The path of current flow is now from the terminal band 23 to the high resistance layer 26*a* and through the parallel path provided by high resistive layer 26*a* and the lower resistance layer 25. Naturally, the larger current will flow through the low resistance layer and this current will then flow back across the high resistive layer 26*a* to the other terminal band 23. Thus a portion of the high resistance layer 26*a* is in series with the low resistive layer 25**, and another portion is in parallel with it. The series portion has large enough area so that it has negligible field whereas the parallel portion, being longer and of smaller cross section, has a high enough resistance so that small variations in its thickness will have slight effect on the total resistance.

This component can be fabricated from the same blank as for Fig. 4. The total resistance can be manually or automatically adjusted by varying the cross-section of the high resistive layer 26 as by removing a part of the material, by machining, cutting, abrading, or the like, or their design may be made to allow for any variations which may occur during production.

*II. Capacitors*

Figure 7:
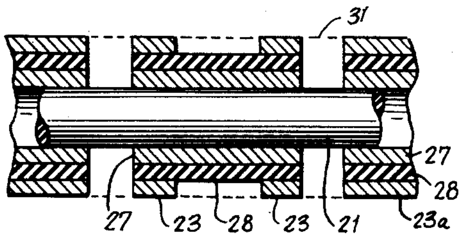
Fig. 7 is a similar elevational view of one form of capacitor according to the invention.

Fig. 7 shows an elementary form of capacitor in which the insulating core 21 is surrounded by a conductive layer 27 surrounding which in turn is a dielectric layer 28. The terminal bands 23 are then positioned about the ends of the dielectric layer 28. The areas of the terminal bands 23 in relation to the inner conductive layer 27 provide in effect two series-connected capacitors, whose capacitance is determined not only by the areas of the conductive portions but also by the dielectric constant of the material of insulating layer 28. For large values of capacitance, it is preferable to use titanium ceramic compounds, such as barium titanate, for the dielectric material, having a dielectric constant of the order of several thousand which can provide compact high value capacitance.

In fabrication, a blank may be formed as above, with the conductive layer 27 continuously formed upon the core 21 in automatic fashion in any suitable way, such as mentioned above. Subsequently, the dielectric layer 28 is formed on the core filament 27 as by spraying, dipping, etc., followed where necessary or desirable by firing, baking or the like. A further continuous conductive layer 23*a* indicated schematically by the dash lines 31, is then formed on top of the dielectric layer 28 in similar manner to the layer 27. Thereafter the filament is machined to remove the material at the left and right edges of the finished component shown in Fig. 7, as by a rotary cutting tool or jet-borne abrasives or ultrasonic machining or by spark machining in which sparks or arcs remove material from the blank. Similarly, the material between desired terminal bands 23 is removed by machining, abrading, or the like. The value of capacitance is determined primarily by the axial length of the terminal bands 23 which can be formed to size while actually indicating the capacitance of the unit so as to remove exactly the correct amounts of material to provide the required capacitance value.

*III. Coils*

Figure 8:
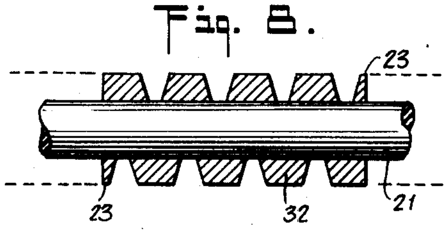
Fig. 8 is a similar elevational view of one form of inductor according to the present invention.
Figure 9:
Fig. 9 is a similar elevational view of another form of inductor according to the invention.

Coils are fabricated in the manner illustrated in Fig. 8 wherein the insulating core 21 is provided with a continuous conductive layer 32 to form a coil blank in which is cut a helical groove to leave a helical conductive strip forming a coil. Terminal bands 23 are automatically formed by leaving a complete circle at the end. Where eddy currents constitute a problem, the closed loops 23 may be omitted. As an alternative form, a double pitch helix can be cut into the conductive coating 32 as shown in Fig. 9 so that the two helical conductive bands remaining are like two intermeshed coils. In this case, no closed end bands are used. The terminal bands of the contiguous filament are made of greater width than the space between the two windings and less than the pitch of either, and separated so that contact will be made to both ends of a single coil or to both ends of both coils, depending upon the rotational position of the filament, without any turns being shorted. If the ends are connected together, one inductor is formed; otherwise the structure is a transformer. This principle can be extended: if there are $2n$ coils cut together as above, and $n$ pairs of correctly spaced terminal bands with the above widths, then a transformer will result with $n$ tightly coupled windings and no shorted turns, invariant of the rotation of the filament. The pitch and number of turns are, of course, determined by the inductance it is desired to provide.

Transformers, especially for high frequency work, can also be provided by axially juxtaposing two such coils.

*IV. Connections*

Figure 10:
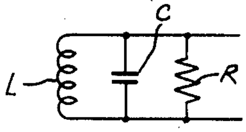
Fig. 10 is a schematic circuit diagram of a parallel tuned circuit with parallel resistance.
Figure 11:
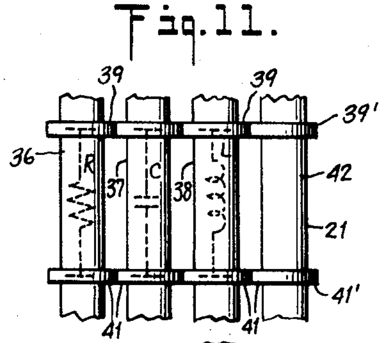
Fig. 11 is an elevational view of an arrangement of filaments in a fabric providing the circuit of Fig. 10.

Connections are effected by contiguity of the conductive terminal bands at the ends of each component. Figs. 10 and 11 illustrate in developed view how a simple parallel resonant circuit with shunting resistance for broad banding might be provided according to the present invention. This circuit as schematically illustrated in Fig. 10 has an inductance L, capacitance C and resistance R all in parallel. As shown in Fig. 11 this circuit can be provided by juxtaposing three core sections 36, 37 and 38, each having terminal bands 39 and 41, the terminal bands being equally spaced and juxtaposed. Element 36 is formed as a resistor in the manner described above and accordingly is so indicated schematically in dotted lines. It is effectively resistance R. Element 37 is formed as a capacitor in the manner described above and hence can serve as the capacitance C of Figure 10. Element 38 is similarly formed as an inductance L, and the parallel connection of these elements is provided by the contacting of the terminal bands 39 and 41.

If further wire connections are desired, simple wiring elements illustrated at 42 can be provided formed by an insulating core 21 with simple terminal bands 39 and 41 formed thereon. In accordance with the principles outlined above, the wiring elements would be formed from a blank having the core 21 continuously coated with conductive material which is removed at appropriate places to leave only the wiring bands 39', 41' of Fig. 11. A conventional wire connection would be formed in the present invention by one or more of these wiring elements 42 juxtaposed to provide any desired length for interconnection of any two points.

As indicated above, wiring or terminal bands are preferably spaced a modular distance apart, so as to engage the similarly spaced component terminal bands. Where convenient, wiring bands need not be in pairs, but may appear singly.

Figure 12:
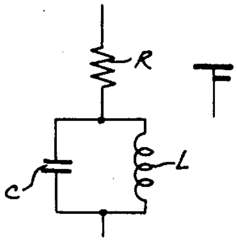
Fig. 12 is a schematic circuit diagram of a different circuit.
Figure 13:
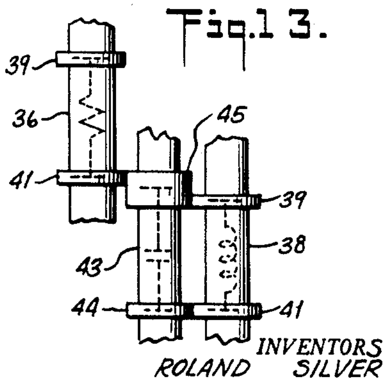
Fig. 13 is an elevational view of a fabric arrangement having the circuit of Fig. 12.
Figure 14:
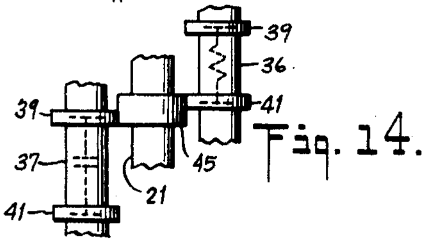
Fig. 14 is an elevational view of the fabric arrangement for a circuit having resistor and capacitor elements connected by a wiring element.

For a series connection, wider terminal bands may be used, such as of triple axial length. This is shown in Fig. 13, showing a series-parallel connection of the type schematically illustrated in Fig. 12. Capacitor element 43 has one single-width band 44 (for parallel-connection) and a triple-width band 45 for series connection to resistor element 36 which is as in Fig. 11. Inductor element 38 is also as in Fig. 11. Fig. 14 shows a series R-C circuit formed by a wide (series-type) wiring band 46.

Figure 15:
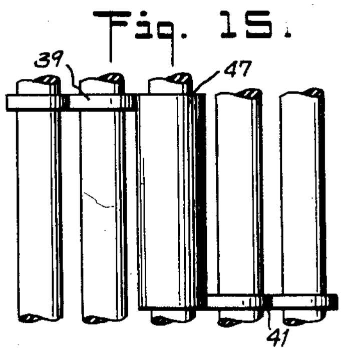
Fig. 15 is an elevational view showing another form of wiring band for a fabric arrangement.

Also, the wiring bands may be made as long as necessary to provide connection between two components at its ends. Thus, in Fig. 15, an elongated wiring band 47 may interconnect two terminal bands 39, 41 at different levels.

It will be understood that two components to be connected need not be contiguous physically, or even in the same region, but can be connected by a "wire" formed from an arbitrary number of pairwise contiguous bands, which "wire" is electrically isolated from all other wires and components if need be. Such wiring provides essentially any electrical connections necessary, and nearly infinite possibilities for interconnection.

It will be understood that the terminal and wiring bands may be pre-tinned or coated with solder in paste or liquid or electroplated form so that upon the application of heat in any desired manner, such as, for example, by inductive heating, the points of contact will become soldered together to form a rigid unitary interconnected structure as desired. In some cases mere pressure or contact may supply suitable electrical connection.

While the elements 36, 37, 38 and 42 are illustrated as circular coplanar rods, it will be understood that they can be any type of axially symmetrical elements and can be stacked in or wound honeycomb fashion to produce a three-dimensional space network. Also these elements need not be linear, but may be formed by adjacent turns of a helical coil, of either single or multiple pitch.

Figure 16:
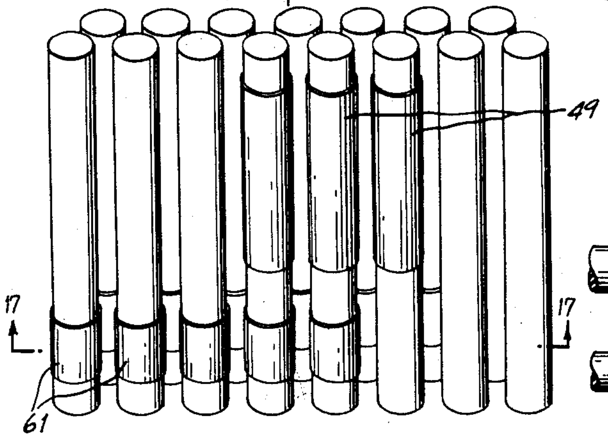
Fig. 16 shows a similar view of an outer terminal or connection for fabric.
Figure 17:
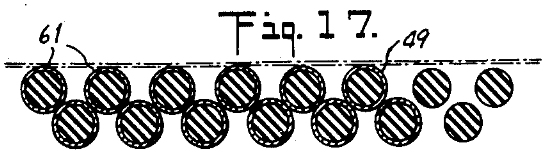
Fig. 17 is a partial cross-sectional view of Fig. 16.

Power connections, and input and output connections may be formed as large connected conductive areas on the outside wires or rods forming the fabric. Two such areas are shown at 49 and 61 in Figs. 16 and 17. Such areas are conductively connected to the interior of the array by "wires" progressing inward and/or downward.

It will be apparent that fabrication of the various components and their interconnection are readily and simply effected by automatic means. The core is provided with successive layers of various materials and then the components are formed by cutting grooves or indentures are formed in the coated core. The more important components, such as those indicated above, have cores which are of no electrical importance and can be shared with other components. Hence, the components can be formed in succession on the same core. Arbitrarily long filament blanks are formed from appropriate materials for the many types of component, these blanks having the core with the coatings already thereon. These blanks are then appropriately machined so as to create strings of components, adjacent components on the same wire being separated by annular grooves which extend to the core. The resultant filaments of components are wound into a coil with components to be interconnected being either juxtaposed with their terminal bands in contact or else juxtaposed to one or more sequentially intermediate wiring bands so as to provide a conductive path therebetween. After such winding, the resultant assemblage may be subjected to various treatments such as heating to perform soldering or potting to perform isolation from atmospheric variations, or the like to form the finished network.

In many cases the same filament blank can be used for a plurality of components. Thus, any of the blanks described above can be used to fabricate wiring bands. The inductor of Fig. 8 or 9 can also be made with any of the blanks described herein. However, certain components may require special blanks, especially as to the cores. For example, metallic cores are undesirable for inductors and may add stray capacitance for capacitors.

In general, the core should be of the strongest and most resilient material that can be easily formed into wire, since the tension on the windings should be as great as possible without approaching the elastic limit of the core. For most filament blanks, the core may be made of steel or other good tensile strength metal, coated with insulation. The insulation should be able to withstand soldering temperatures, where soldering is used, and its temperature coefficient must be in harmony with the other materials used, to prevent cracking. Of course, it should have good electrical properties, notably low power factor. Dielectric strength is of lesser importance, although it should be adequate. A most promising material is Teflon, in view of its good properties and the simple techniques for using it as an enamel on wire.

For the conductive layers, the usual good conductors, such as copper and silver are preferred, since they can be readily applied either electrically or chemically by deposition.

In addition to the foregoing circuit elements, which make up substantially all linear passive networks, the present invention also includes other circuit components useful with the foregoing and manufacturable by similar techniques.

V. *Rectifiers and transistors*

Figure 18:
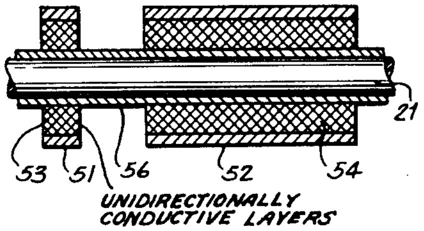
Fig. 18 is a cross-sectional elevational view of a rectifier element according to the present invention.

Rectifiers of the metallic film type, such as those using selenium or copper oxide can be formed as shown in Fig. 18, in which the core 21 is provided with a conductive coating 56, surrounding which is placed a rectifier film coating such as selenium or copper oxide. For example, this might be done by evaporating or by plating. An outer conductor coating is then applied and is cut away where desired. As shown in Fig. 18, the smaller-area outer conductive layer 51 is the anode terminal and the larger-area outer conductive layer 52 is the cathode terminal. These layers 51 and 52 surround respective unidirectionally conductive layers 53, 54 formed for example, of selenium or copper oxide, which in turn surround a continuous conductive layer 56 on the core 21, which may be either insulating or conductive.

This arrangement is essentially two rectifiers connected in series opposition but, because of the difference in surface area, a net unidirectionally conductive characteristic is obtained. Thus, if the ratio of back-to-forward resistivity of the rectifier layer 54 be designated by $r$, and if $a$ be the ratio of anode to cathode area, then the overall back-to-forward resistance is $$\frac{ra+1}{r+a}$$

For copper oxide or selenium operated above a few volts, $r$ is much larger than $a$, and the overall resistance is essentially $a$, which is the ratio of anode length to cathode length and can be made to have any desired value. Of course, any other convenient rectifier materials could also be used.

Figure 19:
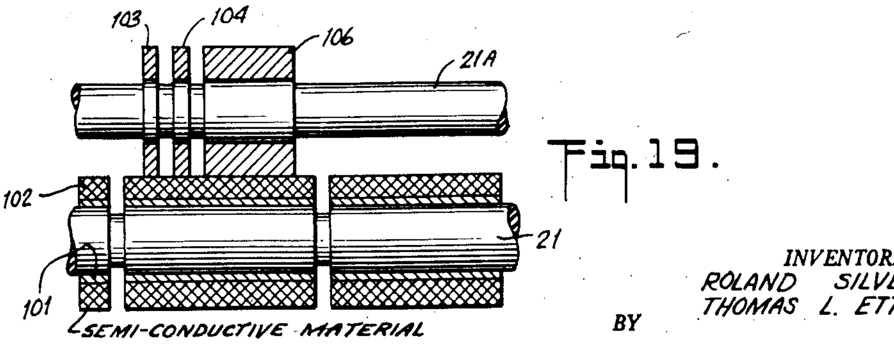
Fig. 19 shows an elevational view partly in longitudinal section of a point-contact transistor element useful in a fabric arrangement.

Point contact rectifiers and transistors may also be provided, one form being shown in Fig. 19. A core 21 is coated with a conductive coating 101 about which is applied a cylinder 102 of germanium or other suitable semi-conductive material. A second core 21A has conductive terminal bands 103, 104, 106 thereon. Band 103 may be the emitter electrode, band 104 the collector electrode, and the wide band 106 the base electrode. The emitter and collector electrodes 103, 104 must be of sufficiently small width (.003 inch or less) and spaced sufficiently close to one another and to the base 106 (.003 inch or less) to provide proper point-contact transistor operation.

Junction transistors may be formed by using appropriate band probes, such as of indium or the like, with a forming process, for example, with sufficient temperature and time to diffuse the indium into the germanium to form a junction layer.

Figure 20:
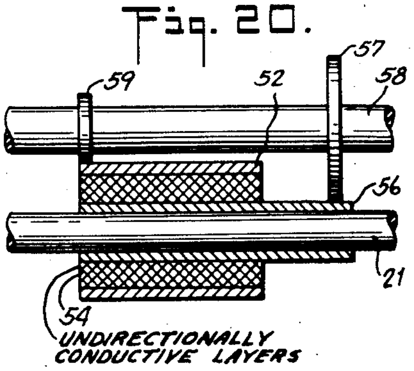
Fig. 20 is a similar view of a modified rectifier element with a modified form of wiring element.

The foregoing circuit and wiring elements form a consistent system, with all elements having the same outer diameter and having modular lengths, permitting simple combination with an infinite variety of networks. The modular length scheme is convenient, but not essential, so long as upon assembly the proper terminals come into contact. Also, in some situations it is acceptable to have wiring elements of different diameter, in which case the structure of capacitor and rectifier elements is simplified, as shown in Fig. 20 which shows a rectifier element as in Fig. 18; but omitting terminal 51 and layer 53. Instead, the conductive layer 56 is laid bare to form one terminal and is in contact with the enlarged wiring band 57 on an adjoining filament 58 which may also have another smaller wiring band 59 for contacting terminal 52. It will be understood that where layer 54 is a dielectric, a capacitor is formed adapted for wiring in the same manner.

In machining blanks and winding filaments to form the fabricated filaments, it is essential that the cuts be accurately positioned along the filaments, despite variations in tension or blank diameter which may cause appreciable variations in the distance between far removed points on the blank. It is therefore desirable to maintain accurate local control of the displacement of the work, closely adjacent the point of assembly into the finished fabric. This may be done, for example, by placing periodic circular scratches on the blanks as soon as produced, to be detected later by optical or electrical methods, which then control application of the cutting or forming tools. Such control can be completely automatic, in response, for example, to perforated tapes or other preformed records produced during design of the fabric for the specific network desired. In this way the blanks and filaments can be moved in accurately controlled discrete steps.

Figure 21:
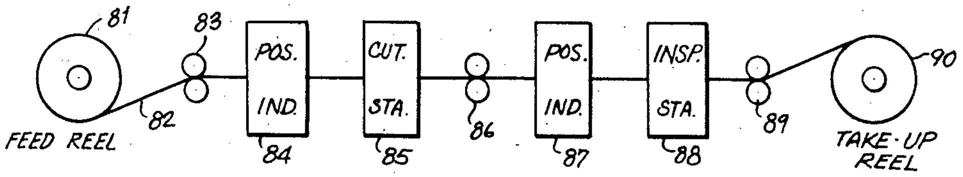
Fig. 21 is a schematic diagram of a mechanism for fabricating the elements and the fabric arrangement.
Figure 22:
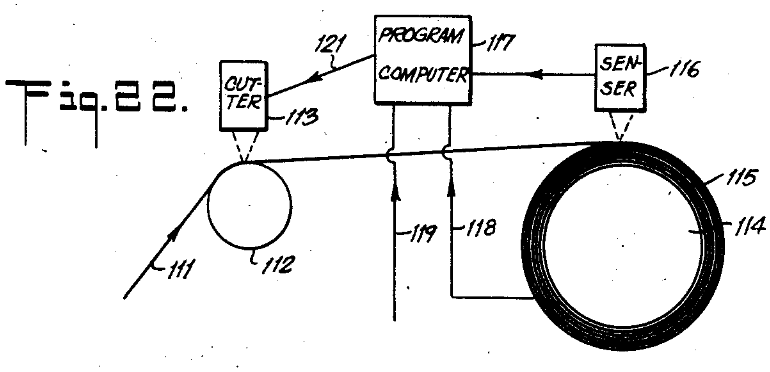
Fig. 22 shows a similar diagram of a modified form of such mechanism.

Fig. 21 shows in schematic form one form of machine for fabricating filaments from blanks. It comprises a feed reel 81 containing a continuous filamentary supply of blank 82 which is fed through braking rollers 83 to a position indicator 84 and thence successively through a cutting station 85, turning supports 86 (which are optional), a second position indicator 87, an inspection station 88, drive rollers 89 and a take-up reel 90, which when desired may be replaced by the fabric winding apparatus described below. The reels 81, 90, the brake 83, turning support 86 and drive rollers 89 are made rotatable relative to the remainder of the machine. The position indicators prevent operation upon the blank until the position-scratches are properly aligned. The cutting station contains automatically operated cutting tools for making the proper length and depth of cuts. The inspection station provides an optical check on length of cut and electrically measures the individual components.

Where accumulated errors may be material, an arrangement may be provided for automatically correcting the cutting of the various bands. This is shown in Fig. 22. In this figure, the filament blank 111 passes over a drum or pulley 112 cooperating with a cutter mechanism 113 of suitable type discussed above, which performs the required fabricating operations to convert the blank into the desired circuit elements. The fabricated blank is then wound on a mandrel 114 to form the complete coil-type "fabric." A sensor mechanism 116 notes the passage of the bands under it, and sends information to a program computer 117 which is also supplied with information as to the instantaneous angular position of mandrel 114 by a connection 118. A pre-recorded program, such as a tape record, is also supplied to computer 117, as indicated schematically at 119. This tape indicates at what angular position of mandrel 114 the various bands should appear, and the computer 117 correspondingly controls the starting and stopping of the cutter 113, by means of a connection 121.

For example, for layer No. 15 of coil 115, the sequence of cutting may be in part as follows:

1. At 10° 35′ of mandrel 114, start band
2. At 10° 45′ of mandrel 114, stop band
3. At 10° 50′ of mandrel 114, start band
4. At 11° 45′ of mandrel 114, stop band
5. At 11° 59′ of mandrel 114, start band As a particular band edge comes under sensor 116, it sends a signal to computer 117 which notes the instantaneous angle of that edge. If, for example, in operation 1 above, the actual band edge position is 10° 33′ (rather than the desired 10° 35′), the computer then retards the cutter correspondingly to correct for such an error, which might have been caused by stretch in the blank, mandrel eccentricity, temperature variation, creep, servo overshoot, etc. If the layer No. 15 being wound had a radius of say 1.571 inch, this angular error of 2′ would correspond to a linear error of .92 mil, and the computer would delay the cutting command to cutter 113 by this .92 mil error, to make the required correction before serious misalignment occurs.

In forming the finished fabric, one simple way is to cut the filament into fixed length sections or "rods" each containing one or more components, and stacking these rods in a three-dimensional array on a flat plate to provide alignment. A form or jig is applied during build-up of the array to prevent sliding and rolling. After completing the array, heat is applied which melts solder on the component terminal bands, resulting in a stable rigid fabric.

Figure 23:
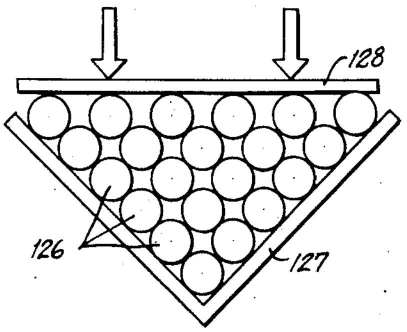
Fig. 23 shows an end view of one form of rod fabric arrangement.

One desirable form of such rod "fabric" array is shown in Fig. 23. The rods 126 are supported by a trough arrangement 127, shown illustratively as having a 90° angle, although other desirable angles may be used. In assembly, the first rod is laid at the bottom of trough 127. The successive layers are then formed by starting rods on lower layers, supported by the sloping sides of trough 127. By use of a 90° angle, a desirable square array of rods is achieved. A 60° angle will produce a triangular array, and other angles may be used. A top plate 128 is finally applied by which pressure is applied to the array, maintaining good electrical contract between the rod bands.

Figure 24:
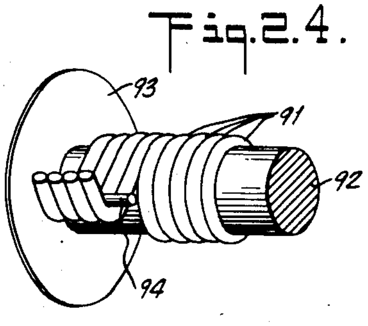
Fig. 24 shows a perspective view of a fragment of apparatus for winding the filament or filaments into a fabric arrangement.

Another and preferable manner of completing the fabric is by winding one or more continuous filaments instead of using separate rods. Fig. 24 shows schematically such an arrangement, in which four filaments 91 are wound side by side upon a rotating mandrel 92 having a flange 93 at either end. As the filaments approach the flange 93, a pin 94 extends paraxially outward and the filaments are looped over it as shown. Then the direction of rotation is reversed so that the filaments 91 are wound oppositely in a second layer in which each filament is displaced by one-half a thread width and falls between two contiguous filaments of the first layer, to build up the fabric in this manner by successive layers to the required number. Of course, the order and arrangement of components and wiring bands is predesigned to yield the desired final array for the fabric. Heat may be applied at intervals to solder the components together. Automatic tensioning means may be provided to make minute registration adjustments by stretching or slackening so that all components will properly align. The final product is a coil in form, which may be potted or otherwise protected from atmospheric effects and unravelling.

Figure 25:
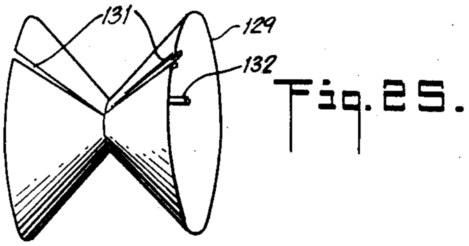
Fig. 25 shows a perspective view of a winding form which is a modification of that in Fig. 24.

The triangular arrangement of Fig. 25 may also be used for continuous filament fabric. A biconical mandrel 129 is used, having a slot 131 therein. A pin 132 slides through slot 131 for the same purpose as pin 94 of Fig. 24. After each layer is covered, the filament is pulled in a loop through the slot 131, hooked over pin 132 and the direction of winding is reversed for the next layer. A multiple filament winding can be made in similar manner, with as many slot and pin arrangements as there are independent threads.

According to another aspect of the invention a plurality of separate continuous filaments may be used. For example, one filament may constitute all the resistors, another all the capacitors, a third all the rectifiers or semi-conductive devices, and a fourth all the inductors. In addition, each filament may include necessary wiring bands or connections. This, of course, is easily accomplished since all types of filament discussed above have an exterior conductive coating which by itself can readily serve as a wiring connection. In this way, one filament may have the resistive layer or layers required for resistors, another can have a semi-conductive layer for rectifiers and the like, while still another has the dielectric layer for capacitors and for inductors. Fabrication is also simplified since each filament may pass through a separate fabricating stage especially adapted for its specific type of circuit component.

It will be understood that the final coil may include a plurality of networks, and can later be cut apart as desired.

Accordingly, it will be seen that the present invention provides a radically novel set of electrical circuit components adapted for unique and automatic assembly into networks as desired.

It will be understood that the foregoing embodiments of the invention are to be deemed illustrative only, since many other forms of the invention will be readily apparent to one skilled in the art without departing from the spirit or the scope of the present invention, which is defined in the appended claims.

What is claimed as the inventions is:

1. An electrical circuit comprising a continuous coiled filament having turns thereof in contiguous relation to one another, said filament being formed to have electric circuit components formed at spaced points along the length thereof, certain of said circuit components on different turns of said filament being in electrical contact to form an electrical circuit, each of said components being formed of equal length sections and with a pair of conductive bands surrounding said filament at the respective ends of each said section, said bands being in contact with similar bands of components on adjacent filaments to form said circuit.

2. An electrical circuit comprising a plurality of lengths of filament in contiguous relationship each length being integrally formed as one or more circuit components, said components being taken from the group comprising resistors, capacitors, inductors, rectifiers, transistors and wiring connectors, with certain components of each length in contact with one or more components of one or more contiguous lengths, a portion of one of said lengths of filament comprising a filamentary core, a resistive coating on said core and a pair of conductive coatings respectively on either end of said resistive coating, said conductive coatings forming terminals for the resistor constituted by the resistive coating therebetween.

3. An electrical circuit comprising a plurality of lengths of filament in contiguous relationship each length being integrally formed as one or more circuit components, said components being taken from the group comprising resistors, capacitors, inductors, rectifiers, transistors and wiring connectors, with certain components of each length in contact with one or more components of one or more contiguous lengths, a portion of one of said lengths of filament comprising a filamentary core, a pair of concentric resistive coatings of different resistivity on said core and a pair of conductive end bands spaced along said core at either end of a section of said coatings and forming terminals for the resistor formed by the coatings therebetween.

4. A circuit as in claim 3 wherein the outer of said resistive coatings is cut away between said end bands.

5. An electrical circuit comprising a plurality of lengths of filament in contiguous relationship each length being integrally formed as one or more circuit components, with certain components of each length in contact with one or more components of one or more contiguous lengths, a portion of one of said lengths of filament comprising a filamentary core having a conductive surface, a dielectric coating surrounding a portion of said surface, and a pair of axially spaced conductive coatings surrounding said dielectric coating and forming terminals for the series-connected capacitor arrangement formed by said coatings and surface.

6. An electrical circuit comprising a plurality of lengths of filament in contiguous relationship each length being integrally formed as one or more circuit components, with certain components of each length in contact with one or more components of one or more contiguous lengths, a portion of one of said lengths of filament comprising a filamentary core having a conductive surface, a dielectric coating section surrounding a portion of said surface, and a conductive coating surrounding a part of said dielectric coating section and forming a terminal for the capacitor formed by said coatings and surface, a second terminal being formed by said conductive surface extending beyond one end of said dielectric coating section.

7. An electrical circuit comprising a plurality of lengths of filament in contiguous relationship each length being integrally formed as one or more circuit components, with certain components of each length in contact with one or more components of one or more contiguous lengths, each of said components being formed of a section of one of said filament lengths with a conductive band at least partially surrounding each end of said section to form a terminal therefor.

8. A circuit as in claim 7 wherein said bands are of equal axial length and certain of said filaments comprise sections each having an insulating surface, a further conductive band at least partially surrounding said surface, said further band having a greater axial length than said equal length for interconnection of said components.

9. A circuit as in claim 7, wherein said filaments are of equal diameter.

10. A circuit as in claim 7 wherein said filaments are stacked in a rectangular array.

11. A circuit as in claim 7 wherein said filaments are stacked in a hexagonal array.

12. An electrical circuit comprising a plurality of lengths of filament in contiguous relationship each length being integrally formed as one or more circuit components, with certain components of each length in contact with one or more components of one or more contiguous lengths, a portion of at least one of said filament lengths comprising a filamentary core section having a conductive surface, a semi-conductive layer on said surface, and a pair of axially spaced conductive layers on said first layer and serving as terminals for the rectifier component formed thereby.

13. A circuit as in claim 12 wherein said conductive layers have unequal axial lengths.

14. An electrical circuit comprising a plurality of lengths of filament in contiguous relationship each length being integrally formed as one or more circuit components, with certain components of each length in contact with one or more components of one or more contiguous lengths, a portion of at least one of said filament lengths comprising a filamentary core section having a conductive surface, a semi-conductive layer on said surface, and a conductive element in contact with said layer.

15. A circuit as in claim 14 wherein said conductive element is a conductive band on an adjacent filament, and further including further conductive bands on said adjacent filament, said bands forming transistor terminals.

16. An electrical circuit comprising a plurality of lengths of filament in contiguous relationship, each length being integrally formed as one or more circuit components with certain components of each length in electrical contact with one or more components of one or more contiguous lengths and with certain components of certain lengths electrically insulated from one or more components of contiguous lengths, each of said components being formed of a section of one of said filament lengths with a conductive band at least partially surrounding each of said sections to form a terminal therefor.

17. A circuit as in claim 16 wherein said lengths are formed by mutually independent filament rods.

18. A circuit as in claim 17 wherein said rods are of equal diameter.

19. A circuit as in claim 17 wherein said rods are stacked in a rectangular array.

20. A circuit as in claim 17 wherein said rods are stacked in a hexagonal array.

21. A circuit as in claim 16 wherein said components are taken from the group comprising resistors, capacitors, inductors, rectifiers, transistors and wiring connectors.

References Cited in the file of this patent

UNITED STATES PATENTS

| | | |
|---|---|---|
| 793,647 | Fessenden | July 4, 1905 |
| 2,268,223 | Peterson | Dec. 30, 1941 |
| 2,441,960 | Eisler | May 25, 1948 |
| 2,542,726 | Sullivan | Feb. 20, 1951 |
| 2,602,988 | Klym | July 15, 1952 |
| 2,607,982 | Hack et al. | Aug. 26, 1952 |
| 2,635,994 | Tierman | Apr. 21, 1953 |
| 2,651,007 | Shepard et al. | Sept. 1, 1953 |
| 2,668,933 | Shapiro | Feb. 9, 1954 |
| 2,673,972 | Minnium | Mar. 30, 1954 |
| 2,682,595 | Rubenstein | June 29, 1954 |
| 2,716,736 | Rex | Aug. 30, 1955 |
| 2,769,119 | Martin | Oct. 30, 1956 |
| 2,798,140 | Kohring | July 2, 1957 |